INVENTORS.
WILLIAM HANT,
MODRINS V. KREISMANIS,
ALLAN W. SCOTT,
BY Paul M. Coble
AGENT.

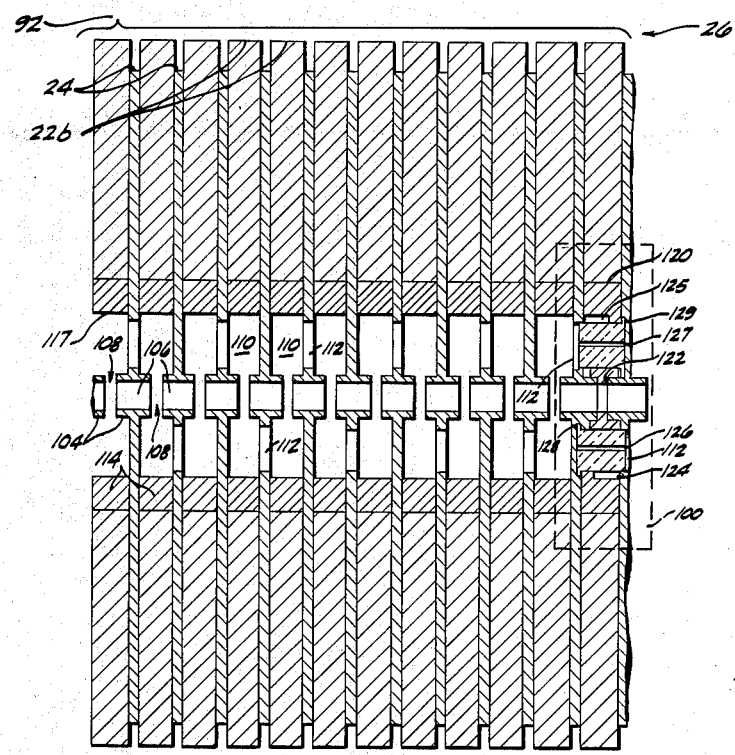
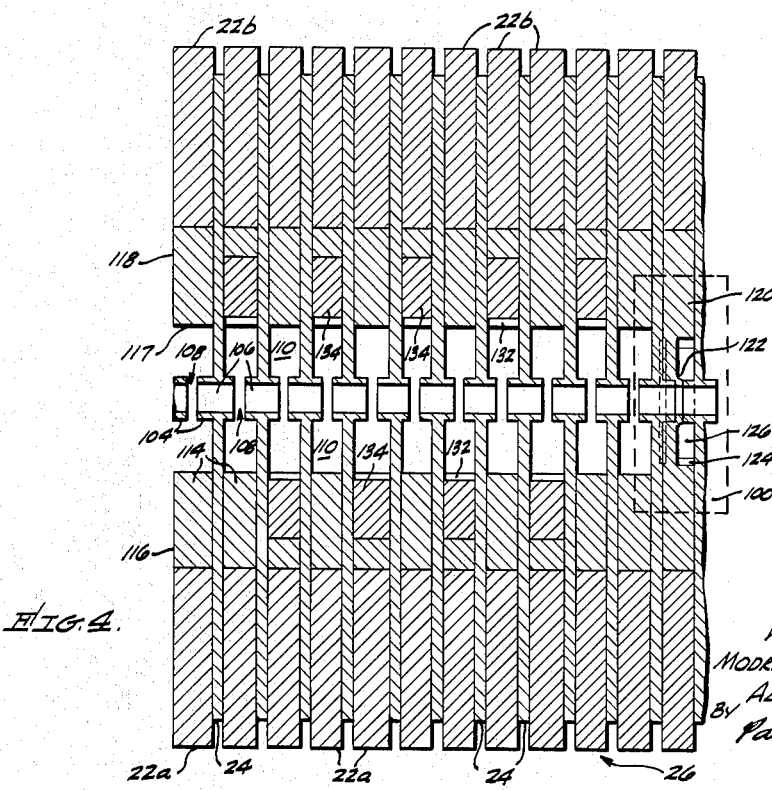
FIG. 3.
FIG. 4.
INVENTORS.
WILLIAM HANT,
MODRINS V. KREISMANIS,
ALLAN W. SCOTT,
BY Paul M. Cole
AGENT INVENTORS.
WILLIAM HANT,
MODRINS V. KREISMANIS,
ALLAN W. SCOTT,
BY Paul M. Cole
AGENT.

INVENTORS.
WILLIAM HANT,
MODRIS V. KREISMANIS,
ALLAN W. SCOTT,
By Paul M. Coble
AGENT.

INVENTORS.
WILLIAM HANT,
MODRINS V. KREISMANIS,
ALLAN W. SCOTT,
BY Paul M. Cole
AGENT

United States Patent Office 3,221,204
Patented Nov. 30, 1965

3,221,204
TRAVELING-WAVE TUBE WITH TRAP MEANS FOR PREVENTING OSCILLATION AT UNWANTED FREQUENCIES
William Hant and Modrins V. Kreismanis, Los Angeles, and Allan W. Scott, Gardena, Calif., assignors to Hughes Aircraft Company, Culver City, Calif., a corporation of Delaware
Filed Nov. 20, 1961, Ser. No. 153,370
25 Claims. (Cl. 315—3.5)

This invention relates generally to microwave devices, and more particularly relates to traveling-wave tubes having means for substantially eliminating oscillations at desired frequencies, such as those at the edges of the tube passband.

In traveling-wave tubes a stream of charged particles, usually electrons, is caused to interact with a propagating electromagnetic wave in a manner which amplifies the electromagnetic energy. In order to achieve such interaction, the phase velocity of the electromagnetic wave is decreased by a slow-wave structure, such as a conductive helix wound about the path of the electron stream or a folded waveguide type of structure in which a waveguide is effectively wound back and forth across the path of the electrons. The slow-wave structure provides a path of propagation for the electromagnetic wave which is considerably longer than the axial length of the structure, and hence, the traveling wave may be made to effectively propagate at nearly the velocity of the electron stream. The interactions between the electrons in the stream and the traveling wave cause velocity modulations and bunching of the electrons in the stream. The net result may then be a transfer of electromagnetic energy from the electron beam to the wave traveling on the slow-wave structure.

The present invention is primarily, although not necessarily, concerned with traveling-wave tubes utilizing slow-wave structures of the folded waveguide type, which structures are also known as the coupled cavity, or interconnected cell type. In this type of slow-wave structure a series of interaction cells, or cavities, are disposed adjacent to each other sequentially along the axis of the tube. The electron stream passes through each interaction cell along the axis of the tube, and electromagnetic coupling is provided between each cell and the electron stream. Each interaction cell is also coupled to an adjacent cell by means of a coupling hole at the end wall defining the cell. Generally, the coupling holes between adjacent cells are alternately disposed on opposite sides of the axis of the tube, although various other arrangements for staggering the coupling holes are possible and have been employed. When the coupling holes are so arranged, the folded waveguide type of energy propagation may be visualized as involving wave energy traversing the length of the tube by entering each interaction cell from one side, crossing the electron stream and then leaving the cell from the other side, thus traveling a sinuous, or tortuous, extended path.

One of the pressing problems in traveling-wave tubes of the coupled cavity variety, and especially high power tubes of this type, is the tendency of the tube to oscillate at frequencies at the edges of the tube passband, and in particular, at the upper cutoff frequency of the passband. This problem arises from the fact that for wideband operation the phase velocity of the slow-wave circuit wave and the velocity of the electron beam should be essentially synchronized over as large a range of frequencies as possible; hence, these velocities are also close to synchronism near both the upper and the lower cutoff frequencies of the tube. Since the interaction impedance is high, and the circuit-to-transmission line match is poor at and in the vicinity of the cutoff frequencies, the loop gain for a section of the tube may be sufficiently large for oscillations to start.

In the prior art, the band edge oscillation problem has been avoided, rather than solved, by reducing the bandwidth of the traveling-wave tube in order to insure a lack of synchronism between the phase velocity of the circuit wave and the beam velocity in the vicinity of the cutoff frequencies. However, when this is done, the resulting tubes suffer from the obvious drawback of having narrow bandwidths.

A further difficulty with prior art traveling-wave tubes has been the narrow range of operating voltages throughout which the tubes are stable, because for small variations in tube operating voltage, the velocity of the electron beam may be changed to such an extent that it is close to synchronism with the phase velocity of the circuit wave in the vicinity of either or both of the cutoff frequencies of the tube. Hence, great care must be taken to insure an extremely constant operating voltage; otherwise the tube could easily become unstable during operation.

Accordingly, it is a principal object of the present invention to provide a traveling-wave tube capable of operating with increased bandwidth and in which any tendency for the tube to oscillate at frequencies in the vicinity of the edges of the tube frequency passband is substantially eliminated.

It is a further object of the present invention to provide a traveling-wave tube of greater stability and wider bandwidth than has heretofore been possible.

It is a still further object of the present invention to provide a traveling-wave tube in which the effect of operating voltage on tube stability is minimized so that the tube may be operated throughout an increased range of voltage for optimum gain and power output.

It is a still further object of the present invention to provide a high-power wide-bandwidth traveling-wave tube of the coupled cavity type having means for preventing oscillations at the edges of the tube passband, and which oscillation preventing means can be readily integrated into the tube structure so as to provide a simple, compact and reliable device, and at the same time maximize the manufacturing efficiency and minimize the cost of the traveling-wave tube.

It is a still further object of the present invention to provide a traveling-wave tube in which oscillations are substantially eliminated throughout predetermined bands of frequencies in the vicinity of the upper and lower cutoff frequencies of the tube.

It is still a further object of the present invention to provide a highly stable and reliable traveling-wave tube having a readily controllable gain vs. frequency characteristic.

In accordance with the foregoing objectives, the present invention provides attenuation for frequencies at which the tube would normally oscillate, especially frequencies in the vicinity of the edges of the frequency passband of the tube, in order to substantially decrease the gain at these frequencies and thereby suppress the oscillations. More specifically, circuit loss in the form of one or more lossy ceramic elements is added to the slow-wave structure to attenuate the frequency, frequency range, or ranges where the tube is likely to oscillate without affecting the rest of the fundamental passband. The loss is disposed in cavities which are coupled to the interaction cells of the tube and which are made resonant at the frequency or frequencies to be attenuated. The cavities may contain solid loss buttons or may be reentrant and contain hollow loss elements. Moreover, the cavities may be stagger tuned to introduce loss throughout one or more bands of frequencies. Also, higher order cavity resonances may be utilized to attenuate desired frequencies.

Other and further objects, advantages, and characteristic features of the present invention will become readily apparent from the following detailed description of preferred embodiments of the invention when taken in conjunction with the appended drawings in which:

FIG. 3 is a longitudinal sectional view taken along line 3—3 of FIG. 2;

FIG. 4 is a longitudinal sectional view taken along line 4—4 of FIG. 2;

Figure 1:
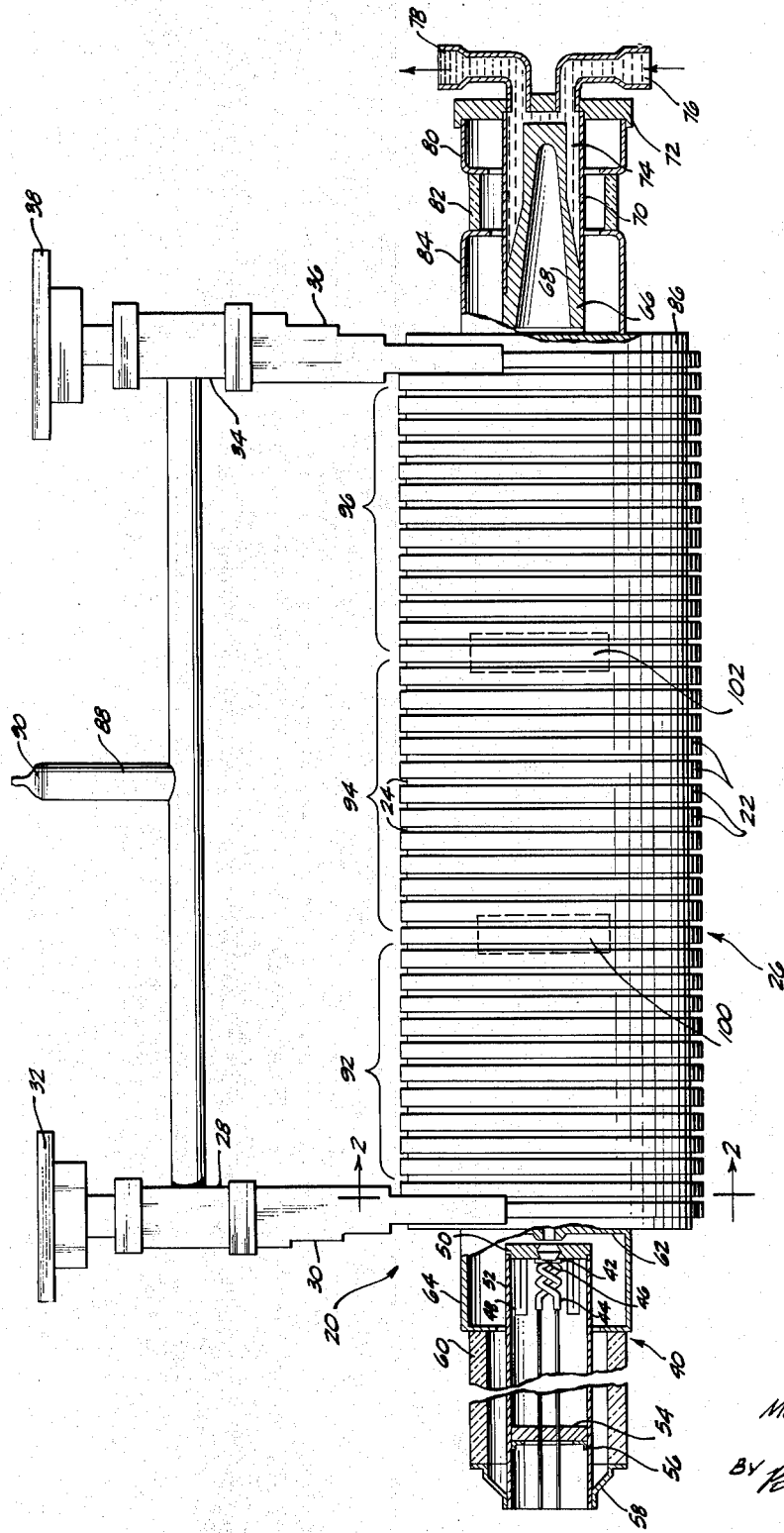
FIG. 1 is an over-all view partly in longitudinal section and partly broken away of a traveling-wave tube constructed in accordance with the present invention.
Figure 2:
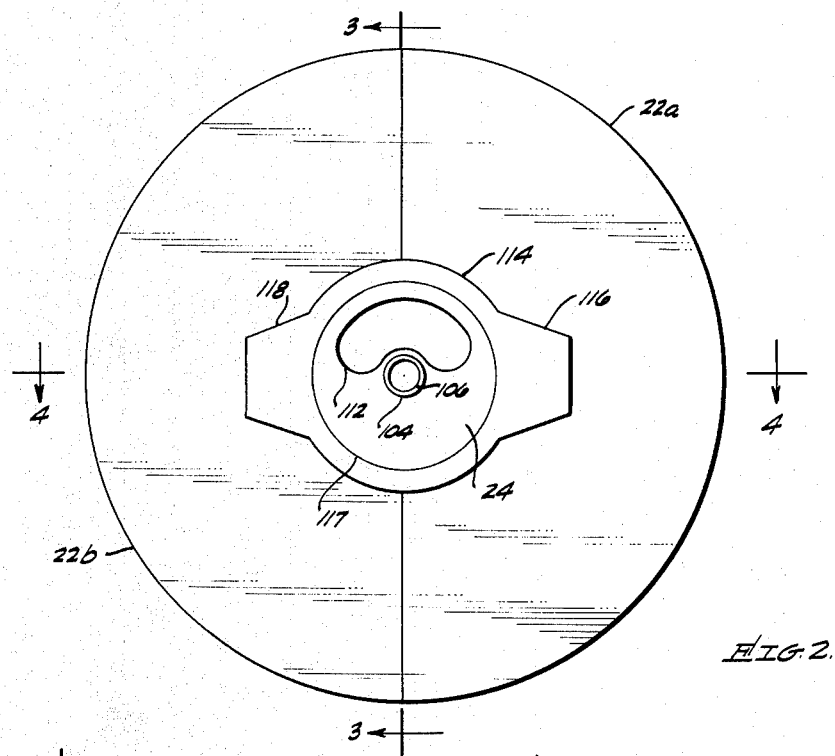
FIG. 2 is a cross-sectional view taken along line 2—2 of FIG. 1.

Referring now to the drawings, and in particular to FIG. 1, an entire traveling-wave tube is illustrated for purposes of completeness of discussion and to best establish the proper environment for the ensuing discussion with respect to the essence of the present invention. In FIG. 1 there is illustrated a traveling-wave tube, designated generally by the numeral 20, which utilizes a plurality of essentially annular disk-shaped focusing magnets 22. In the example of this figure, the magnets 22 are permanent magnets and are diametrically split into two sections, as shown in FIG. 2, to permit their being readily inserted between assembled adjacent ones of a series of ferromagnetic pole pieces 24, which are illustrated more fully in FIGS. 3 and 4. The system of pole pieces 24, magnets 22, and spacer elements (to be described later) form both a slow-wave structure and an envelope for the traveling-wave tube, the slow-wave structure being designated generally by the reference numeral 26.

Coupled to the input end of the slow-wave structure 26 is an input waveguide transducer 28 which includes an impedance step transformer 30. A flange 32 is provided for coupling the assembled traveling-wave tube 20 to an external waveguide or other microwave transmission line (not shown). The construction of the flange 32 may include a microwave window (not shown) transparent to radio frequency energy but capable of maintaining a vacuum within the traveling-wave tube 20. At the output end of the tube 20, an output transducer 34 is provided which is substantially similar to the input transducer 28 and which includes an impedance step transformer 36 and a coupling flange 38, which elements are similar to the elements 30 and 32, respectively of the input transducer 28.

An electron gun, indicated generally by the numeral 40, is disposed at one end of the traveling-wave tube 20 and comprises a cathode 42 which is heated by a filament 44. The cathode 42 has a small central opening 46 to aid in axially aligning the gun assembly with the remainder of the traveling-wave tube 20. The cathode 42 is secured about its periphery by a cylindrical shielding member 48 which is constructed in a manner to fold cylindrically symmetrically back upon itself to form a double cylindrical shield and an extended thermal path from the cathode 42 to its outer supporting means. Such a support and an electrical highly conductive path to the cathode are thus achieved, while providing considerable thermal insulation for the cathode 42 and filament 44 due to the extended heat conduction path, as well as because of the multiple cylindrical shielding against radiant heat which is provided by the cylinders shown. For additional details of this type of construction, reference is made to Patent No. 2,817,039, entitled "Cathode Support," issued December 17, 1957, to J. A. Dallons and assigned to the assignee of the present invention.

A focusing electrode 50 supports the cylindrical shielding member 48. The focusing electrode 50 is generally maintained at the same potential as that of the cathode 42 and is shaped to focus the electron stream emitted by the cathode in a well-collimated, high perveance beam of electrons which traverses the slow-wave structure 26 and electromagnetically interacts with microwave energy being propagated therealong. The electron gun configuration may be generally in accordance with the teachings of Patent No. 2,817,033, entitled "Electron Gun," issued December 17, 1957 to G. R. Brewer and assigned to the assignee of the present invention, and to which reference may be made for a more detailed explanation. The focusing electrode 50 is in turn supported by a tubular support 52 which extends from the periphery of the focusing electrode 50 outwardly to the extremity of the traveling-wave tube 20. The tube 52 is hermetically sealed near its end away from the support 50 by means of a metal-to-ceramic seal 54 at a sealing flange 56 made of a material having a low coefficient of thermal expansion, such as an alloy of iron, cobalt, and nickel sold under the registered trademark "Kovar." The outer end of the tubular support 52 is supported by an annular flange member 58, which also may be of a "Kovar" alloy and which is sealed in turn to a ceramic supporting tube 60. The ceramic tube 60 further thermally insulates the inner intensively heated members of the electron gun 40 and also provides electrical insulation between the cathode-focusing assembly and accelerating anode 62. Substantially encasing the electron gun 40 and secured to the central, or slow-wave, structure 26 of the traveling-wave tube 20 is a tube 64, which may be of a "Kovar" alloy, to which is sealed the ceramic tube 60, thus completing a vacuum envelope about the electron gun end of the traveling-wave tube 20.

At the opposite end of the traveling-wave tube 20, there is provided a cooled collector electrode 66 which has a conically-shaped inner surface 68 for collecting the electrons from the electron stream and dissipating their kinetic energy over a large surface. The collector electrode 66 is supported within a tubular water jacket 70, which in turn is supported by an end plate 72. A water chamber 74 is thus formed between the outer surface of the collector electrode 68 and the inner surface of the water tube 70. A water inlet tube 76 supplies cool water to the chamber 74, and a water outlet tube 78 exhausts the heated water out of the chamber 74. Thus, considerable power may be dissipated without destruction of the collector electrode. Although water has been specified, obviously, other liquids or gases may be used as coolants.

The end plate 72 is sealed to a supporting tube 80, which may be of a "Kovar" alloy, and which is in turn sealed to a ceramic insulating tube 82. The insulating tube 82 is sealed at its opposite end to a supporting tube 84, which is in turn supported and sealed to end disk 86 of the slow-wave structure 26. The collector 68, the end plate 72, the supporting tubes 80 and 84, and the insulating tube 82 are all coaxially supported in alignment with the axis of the traveling-wave tube 20.

For vacuum pumping or out-gassing the traveling-wave tube 20, a double-ended pumping tube 88 is connected to both of the input and output waveguide transducers 28 and 34. Out-gassing during bake-out of the entire traveling-wave tube 20 may thus be achieved as rapidly as possible. After the out-gassing procedure, the tube 88 may be separated from the vacuum pumping system by pinching off the tube at the tip 90.

The traveling-wave tube 20 may be severed into a number of amplifying sections which are designated as 92, 94, and 96 in FIG. 1, although it is to be understood that three amplifying sections are shown solely for illustrative purposes. Each of the amplifying sections is isolated from the others by an isolator, or termination, section. Thus, in the traveling-wave tube of FIG. 1 the first amplifying section 92 is isolated from the second amplifying section 94 by means of isolator section 100, while the second amplifying section 94 is isolated from the third amplifying section 96 by means of isolator section 102. The structure of one type of isolator section which may be employed is shown in FIGS. 3 and 4 and will be discussed in more detail in conjunction with these figures. At this point it suffices to describe the function of the isolation sections 100 and 102 as generally providing a substantially complete radio frequency isolation for circuit wave energy between adjacent amplifying sections of the slow-wave structure 26, while at the same time allowing the electron stream to pass straight through the entire length of the traveling-wave tube 20. Since the electron stream is modulated at the output of each amplifying section, as it enters the subsequent amplifying section, it launches a new wave therein which is amplified by the interaction between the new traveling wave and the electron stream. Thus unidirectional coupling between adjacent amplifying sections is provided through the electron stream.

The actual construction of the slow-wave structure 26 is illustrated in more detail in FIGS. 2–4. Although FIGS. 3 and 4 show only the first amplifying section 92, it will be readily apparent that the remaining amplifying sections 94 and 96 are constructed in a similar manner. As has been mentioned above, a plurality of ferromagnetic pole pieces 24 are interposed between a plurality of essentially annular disk-shaped focusing magnets 22, which as indicated in FIGS. 2 and 4 are diametrically split into semicircular members 22a and 22b to facilitate their being applied to the slow-wave structure 26 after it has been otherwise assembled. The ferromagnetic pole pieces 24 extend radially inwardly to approximately the perimeter of the region adapted to contain the axial electron stream. The individual pole pieces 24 are constructed in such a manner that a short drift tube 104 is provided at the end of each pole piece. The drift tube 104 is in the form of a cylindrical extension, or lip, protruding axially along the electron stream from both surfaces of pole pieces 24, i.e., in both directions normal to the plane of the pole piece 24. The drift tubes 104 are provided with central and axially aligned apertures 106 to provide a passage for flow of the electron beam. Adjacent ones of the drift tubes 104 are separated by a gap 108 which functions as a magnetic gap to provide a focusing lens for the electron stream and also as an electromagnetic interaction gap to provide interaction between the electron stream and microwave energy traversing the slow-wave structure.

Disposed radially within each of the magnets 22 is a conductive nonmagnetic slow-wave circuit spacer element 114. The spacer element 114 has an annular portion of an outer diameter essentially equal to the inner diameter of the magnets 22 and a pair of oppositely disposed ear portions 116 and 118 projecting outwardly from the annular portion. Central apertures 117 in the respective spacer elements 114 provide space for a plurality of microwave interaction cells, or cavities, 110 which are defined by the inner lateral surfaces of the spacers 114 and the walls of the pole pieces 24 projecting inwardly of the spacers 114. The inner diameter of the spacer 114 determines the radial extent of the interaction cell 110, while the axial length of the spacer 114 determines the axial length of the cell 110. The spacers 114 are fabricated of a nonmagnetic material, such as copper, thus providing a highly conductive cavity wall, while not magnetically shorting out the focusing gaps 108. The entire interior surfaces of the cavities 110 may be plated with a highly conductive material such as a thin silver, copper or gold plating.

The axial length of the magnets 22, hence that of the spacers 114, is substantially equal to the spacing between adjacent pole pieces 24, and the radial extent of the magnets 22 is approximately equal to or, as shown, slightly greater than that of the pole pieces 24. To provide the focusing lenses in the gaps 108, adjacent ones of the magnets 22 are stacked with opposite polarity, thus causing a reversal of the magnetic field at each magnetic lens along the tube and thereby providing a periodically focused device.

It should also be pointed out that although the lengths of the spacers 114 may be substantially constant, they may also be varied slightly with respect to each other so that the effective axial length of the interaction cells 110 is varied as a function of tube length to insure that the desired interaction between the electron stream and the traveling waves will continue to a maximum degree even though the electrons are decelerated toward the collector end. For such arrangements reference is made to Patent No. 2,956,200, entitled "Periodically Focused Traveling Wave Tube With Tapered Phase Velocity," issued October 11, 1960 to D. J. Bates and assigned to the assignee of the present invention.

For interconnecting adjacent interaction cells 110 an off-center coupling hole 112 is provided through each of the pole pieces 24 to permit the transfer of radio frequency energy from cell to cell along the slow-wave structure 26. As is illustrated in FIGS. 2 and 3, the coupling holes 112 may be substantially kidney-shaped and may be alternately disposed 180° apart with respect to the drift tubes 104 to provide a tortuous path for the electromagnetic wave propagating along the tube. It should be pointed out, however, that the coupling holes 112 may be of other shapes and may be staggered in various other arrangements, such as those disclosed and claimed in Patent No. 3,010,847, entitled "Traveling Wave Tube," issued November 21, 1961 to D. J. Bates and assigned to the assignee of the present invention.

As has been mentioned above, an isolator, or termination, section is provided between the respective amplifying sections to afford a substantially complete radio frequency sever between the amplifying sections. In FIGS. 3 and 4 a typical isolator section 100 is shown at the end of the first amplifying section 92. The isolator section 100 is formed in a substantial continuity of the pole piece-magnet-spacer assembly. However, at the isolator section a special spacer element 120 is employed having a central portion 122 which is disposed in the gap 103 between the drift tubes 104 in the isolator section 100. The portion 122 divides the space inside the spacer 120 into a pair of modified cavities 124 and 125 and also serves as a short circuiting vane which substantially isolates the cavities 124 and 125 from the electron stream, as well as from each other. The modified cavities 124 and 125 are substantially filled with lossy attenuating material, which may be in the form of lossy ceramic buttons 126 and 127 having enlarged head portions 128 and 129, respectively. The attenuator buttons 126 and 127 extend from within a coupling hole 112 through the special spacer 120 and partially into the wall of the isolator pole piece 24 opposite the said coupling hole. A recess is provided in the side of each isolator pole piece 24 facing the special spacer 120. These recesses extend approximately half-way through the pole pieces 24 and retain the enlarged head portions 128 and 129 of the attenuator buttons 126 and 127.

The microwave energy in the section 92 of the slow-wave structure 26 and traveling toward the isolator section 100 may enter the isolator section 100 through coupling hole 112 in the isolator pole piece 24 adjacent the section 92 and will be intercepted by the attenuator button 127. Whatever fraction of the microwave energy is not absorbed and dissipated in the button 127 may pass on to the associated cavity 125 where it will eventually be completely absorbed. In exactly the same manner, microwave energy in the section 94 of the slow-wave structure 26 and traveling toward the isolator section 100 will be substantially completely absorbed by the attenuator button 126 in the cavity 124.

For a more detailed description of the type of isolator section described above reference is made to Patent No. 2,985,791, entitled "Periodically Focused Severed Traveling-Wave Tube," issued May 23, 1961 to D. J. Bates et al. and assigned to the assignee of the present invention. It should also be pointed out, however, that traveling-wave tubes constructed in accordance with the principles of the present invention are not limited to those employing this type of isolator section, but various other forms of isolation and termination means, for example external terminations or hybrid terminations, may be employed.

In the operation of the traveling-wave tube 20, microwave energy traverses the slow-wave structure 26 from the electron gun end to the collector end, being amplified first in section 92 on account of its interaction with the electron stream. Near the output of this amplifying section, the traveling wave has grown and has caused considerable charge density modulation in the electron stream. At the first isolator section 100 the radio frequency energy in the slow-wave structure 26 is substantially completely absorbed. However, the modulated electron stream passes on to the next amplifier section, section 94, where it launches a new traveling wave in that section. The new traveling wave grows and is amplified by the electron stream until reaching its output end at the isolator section 102. The electron stream is further modulated, and the radio frequency energy in the slow-wave structure is again completely absorbed. This procedure is repeated in the amplifier section 96, and the amplified output wave from the section 96 is fed into the output waveguide through the transducer 34.

As has been mentioned above, one of the problems in prior art traveling-wave tubes of the type described is the tendency of the tube to oscillate at frequencies at the edges of the tube's frequency passband. The present invention solves this problem by providing loss for frequencies at which the tube would otherwise oscillate in order to substantially decrease the gain at these frequencies and thereby suppress the oscillations. More specifically, circuit loss in the form of lossy ceramic elements is added to the coupled cavity circuit to attenuate the frequency, frequency range, or ranges, where the tube is likely to oscillate, without affecting the rest of the fundamental passband. The loss is disposed in cavities which are made resonant at the frequencies to be attenuated.

Figure 5:
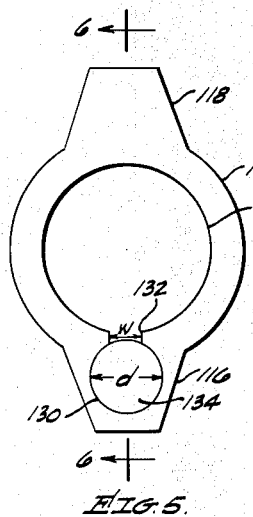
FIG. 5 is a plan view of a typical slow-wave circuit spacer element provided with resonant loss according to one embodiment of the present invention.
Figure 6:
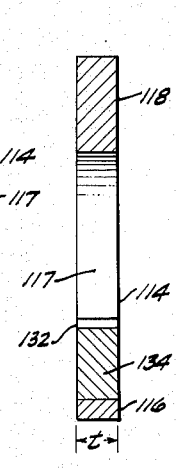
FIG. 6 is a sectional view taken along line 6—6 of FIG. 5.

The manner in which the present invention introduces resonant loss to the slow-wave circuit is illustrated in FIGS. 5 and 6. As is shown in these figures the slow-wave circuit spacer element 114 defines a cylindrical cavity 130 in its projecting ear portion 116. The cavity 130 has a diameter "$d$" and is coupled to the central aperture 117 in the spacer 114 by means of a coupling hole 132 of width "$w$," the spacer 114 having a thickness "$t$." The significance of these dimensions will become more apparent as the description proceeds. Lossy dielectric material in the form of a cylindrical ceramic button 134 is disposed in the cavity 130. The cavity 130 is designed to resonate at the frequency at which loss is to be introduced into the circuit. Although in a preferred embodiment this frequency is at or near the upper cutoff frequency of the traveling-wave tube, it is to be understood that the resonant loss frequency may be any preselected frequency. At the resonant loss frequency, radio frequency energy from the interaction cell 110 is coupled into the resonant loss cavity 130 through the iris 132. In a preferred embodiment of the present invention the cavity 130 is designed to resonate in the $TM_{010}$ mode, and for this mode, the resonant frequency is determined by the diameter of the cavity and the dielectric constant of the lossy material. However, since the normal $TM_{010}$ cylindrical cavity mode is perturbed by the relatively large iris 132, which is designed to provide critical coupling into the cavity 130, the resonant frequency also becomes a function of the iris dimensions. Thus, the cavity diameter "$d$," the iris thickness "$w$," and the dielectric constant $\epsilon$ of the lossy material in the button 134 must be varied dependently to achieve the desired attenuation at the desired frequency.

An example of a material which may be used for button 134 is a mixture of forsterite and silicon carbide, with the percentage of silicon carbide varying from essentially 3% to essentially 10%, and preferably being around 5%. Examples of other materials which could be used are silicon carbide and alumina, silicon carbide and talc, or other ceramic and lossy material combinations. When selecting a suitable material it is desired that the quality factor Q of the dielectric, which is the ratio of the dielectric constant $\epsilon'$ to the loss constant $\epsilon''$, be essentially between 10 and 100. For a particular mixture of 5% silicon carbide and 95% forsterite which has been used, the dielectric constant $\epsilon'$ was about 8 and the loss constant $\epsilon''$ was about 0.16, giving a Q of 50.

In a preferred embodiment of the invention the diameter "$d$" of the cavity 130 may vary from essentially 0.25 to essentially 0.27 inch, preferably being about 0.265 inch; while the width "$w$" of the coupling iris 132 may vary between essentially 0.2 and 0.25 inch, preferably being about 0.225 inch; the thickness "$t$" of the spacer 114 preferably being about 0.114 inch. The effect of the dimensions "$d$" and "$w$" and the composition of the material on the resonant frequency of the cavity 130 may be illustrated by the following table:

| Percent SiC with forsterite | Diameter "d" (inches) | Width "w" (inches) | Resonant Frequency (kmc.) |
|---|---|---|---|
| 3 | 0.255 | 0.220 | 12.5 |
| 5 | 0.255 | 0.220 | 12.0 |
| 10 | 0.255 | 0.220 | 11.5 |
| 5 | 0.270 | 0.250 | 10.0 |

It is pointed out that the above data are merely exemplary values characteristic of resonant loss devices which have been constructed and which have operated successfully. Their listing herein is intended solely for illustrative purposes and is in no way intended to limit the present invention to use of these dimensions or materials. In addition, it should be pointed out that as the composition is changed the Q will be affected, i.e., as the percentage of SiC is increased the Q will decrease.

The manner in which the resonant loss buttons may be utilized in a traveling-wave tube is illustrated in FIG. 4. As will be apparent from this figure, most of the spacers 114 are provided with a resonant cavity containing a loss button 134. Although the loss buttons 134 are illustrated as being disposed on alternate sides of the drift tubes 106, it should be pointed out that the axial arrangement of the loss buttons is not critical, and various other arrangements are possible without detracting from the operation of the device. For example, all the buttons may be located on the same side of the drift tubes, or they may be alternated in groups of two or three, etc.

Figure 16:
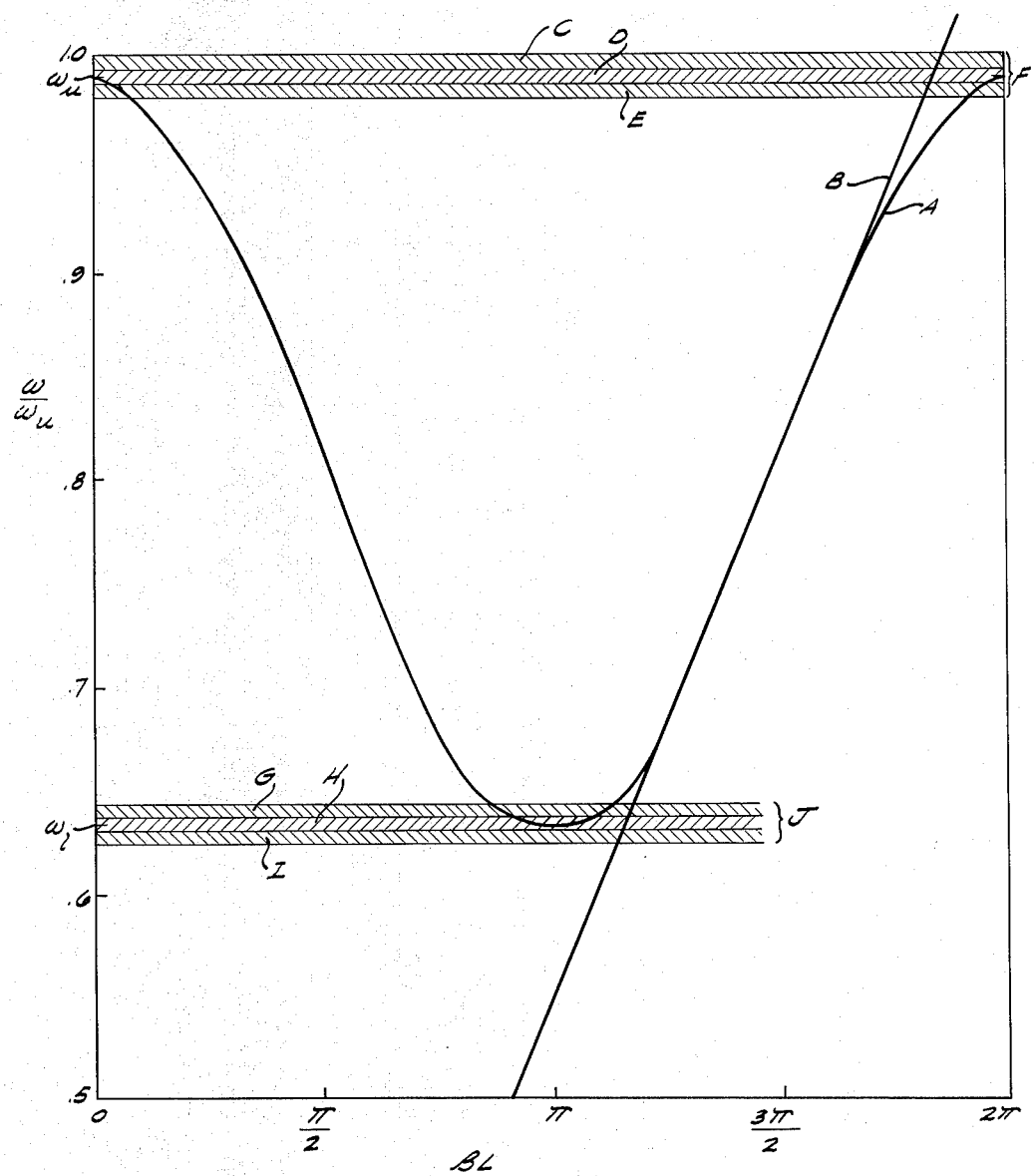
FIG. 16 is an ω-β graph used in explaining the theory of the present invention.

The theory behind the present invention may be better understood by making reference at this time to FIG. 16. In FIG. 16 there is shown an $\omega$-$\beta$ graph in which the normalized frequency $\omega/\omega_u$, where $\omega_u$ is the upper cutoff frequency of the traveling-wave tube, is plotted as a function of the phase constant $\beta$ multiplied by the periodic length L of the slow-wave structure 26. The frequency-phase characteristic of the slow-wave circuit of the traveling-wave tube is represented by the curve A, while the frequency-phase characteristic of the electron beam is represented by the line B. Since it is desired to operate the traveling-wave tube on a forward mode of the slow-wave circuit wave, the characteristic B of the electron beam is made as nearly coincident as possible with the forward portion of the circuit characteristic A over as wide a frequency range as possible. The greater the range of essential coincidence between the curves A and B, the wider the range of frequencies at which the tube can operate, hence the greater the passband of the tube. However, for the arrangement illustrated by the curves A and B of FIG. 16 (without the resonant loss means of the present invention), at and near the upper and lower cutoff frequencies $\omega_u$ and $\omega_l$, respectively, i.e., where the slope of the curve A is zero, there is a strong tendency for the traveling-wave tube to oscillate. This is because in the vicinity of the upper and lower cutoff frequencies the interaction impedance is high and the circuit-to-transmission line match is poor, thereby providing a large gain for the tube. The present invention solves the passband edge oscillation problem by providing well defined, narrow band loss gaps in those regions where there is a strong tendency for oscillation, i.e., throughout bands of frequencies at and including the upper and lower cutoff frequencies $\omega_u$ and $\omega_l$ of the traveling-wave tube. This is accomplished by coupling to the slow-wave circuit interaction cells, cavities which have been made resonant at the desired frequencies and by providing in the cavities loss for attenuating these frequencies.

The embodiment illustrated in FIG. 4, which uses a plurality of single solid loss buttons 134, is designed to introduce resonant loss throughout a band of frequencies in the vicinity of the upper cutoff frequency $\omega_u$ of the traveling-wave tube. This band is indicated by the letter F in FIG. 16. In order to form a more accurately defined and, at the same time, a sufficiently wide loss band, the over-all resonant loss band F at the upper cutoff frequency actually consists of a plurality of individual resonant loss bands C, D, and E. Each of the individual resonant loss bands C, D, and E is introduced by a single resonant loss cavity 130 and button 134. However, the respective cavities 130 are stagger tuned, that is each cavity is made resonant at a slightly different frequency so that the resonant loss button in each cavity will attenuate a slightly different band of frequencies. Thus, for the arrangement illustrated in FIG. 16, one of the resonant loss cavities is tuned to resonant at frequencies in the band C, another to the frequency band D, and a third to the frequency band E. Thus the over-all effect is to spread the loss required over the desired frequency range F about the upper cutoff frequency $\omega_u$. It should be apparent that the selection of three individual loss bands to illustrate the stagger tuning principle was solely for illustrative purposes, and in constructing tubes according to the present invention various numbers other than three of individual loss bands may be used to form the over-all loss band F.

In the operation of the traveling-wave tube illustrated in FIG. 4, microwave energy in the frequency band around the upper cutoff frequency of the tube is directed into the resonant cavities 130 and is attenuated by the lossy ceramic buttons 134. Hence a sharply defined loss band is provided around the upper cutoff frequency of the traveling-wave tube, thereby substantially eliminating any tendency for the tube to oscillate in the vicinity of this frequency.

It should be emphasized that in the design of the resonant loss cavities it is not only important that the resonant frequency be accurately controlled, but strong coupling must exist between the slow-wave circuit interaction cells 110 and the resonant loss cavities 130 so that maximum attenuation for loss cavities can be provided.

Figure 7:
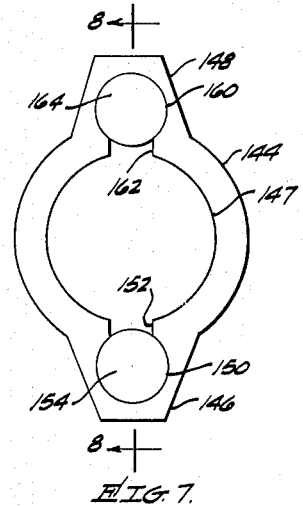
FIG. 7 is a plan view of a slow-wave circuit spacer element provided with a pair of resonant loss elements in accordance with another embodiment of the present invention.
Figure 17:
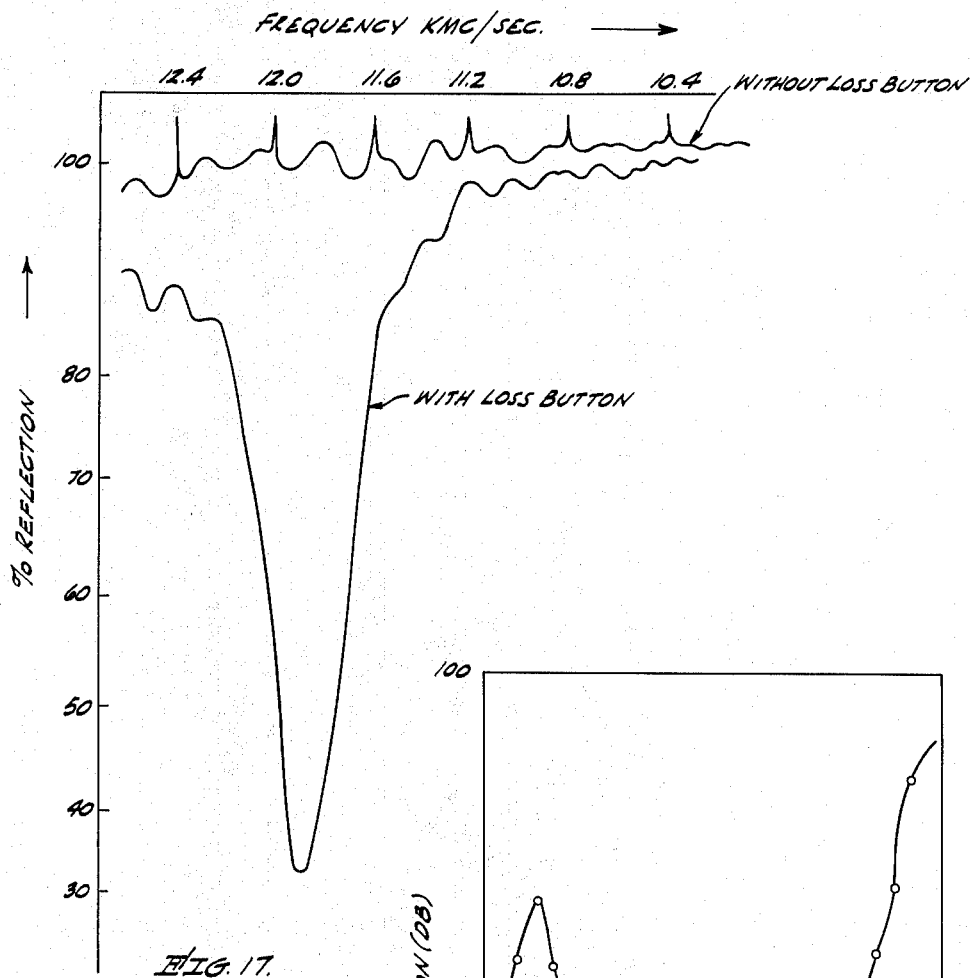
FIG. 17 is a graph illustrating the percentage reflection as a function of frequency for a typical resonant loss cavity with and without a resonant loss button.

FIG. 7 illustrates the effect of a resonant loss cavity on attenuating the microwave energy. In this figure the percent reflection of an input wave is plotted as a function of frequency for a single resonant cavity 130 coupled to the slow-wave circuit 26, both with and without a loss button 134. From FIG. 17 it may be observed that with the insertion of a loss button 134 into the cavity 130, a sharply defined decrease in the amount of wave energy reflected is achieved at the resonant frequency, which in FIG. 17 is approximately 11.9 kmc. per second. Thus, energy at the resonant frequency is heavily attenuated when the loss button is inserted in the resonant cavity, and the effect of suppressing energy at this frequency is achieved.

Figure 8:
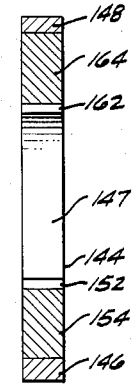
FIG. 8 is a sectional view taken along line 8—8 of FIG. 7.

A modified form of the present invention is illustrated in FIGS. 7 and 8. In this embodiment a slow-wave circuit spacer element 144 is employed which is similar to the spacer element 114 except that it is adapted to receive a pair of resonant loss buttons rather than only a single loss button. More specifically, the spacer element 144 defines a pair of cylindrical cavities 150 and 160 which are disposed in the respective projecting ear portions 146 and 148 of the spacer 144. The cavities 150 and 160 are coupled to central aperture 147, which in the assembled traveling-wave tube defines an interaction cell 110, by means of coupling holes, or irises, 152 and 162, respectively. A cylindrical loss button 154 is disposed within the cavity 150, while a similar loss button 164 is located in the cavity 160. The loss buttons 154 and 164 may be of the same material as the loss button 134 of FIG. 5. However, in the embodiment of FIGS. 7 and 8 one of the cavities is resonant at the lower cutoff frequency $\omega_l$, while the other cavity is made to resonate at the upper cutoff frequency $\omega_u$. Again, the particular frequency at which the cavity 150 or 160 resonates is determined by the cavity diameter "$d$," the width "$w$" of the coupling iris, and the dielectric constant $\epsilon$ of the lossy material.

With reference to FIG. 16, it may be observed that by using a plurality of the spacers 144 in the traveling-wave tube slow-wave structure, the stagger tuning principle may be employed to introduce loss bands in the vicinity of both the upper cutoff frequency $\omega_u$ and the lower cutoff frequency $\omega_l$ of the traveling-wave tube, thereby reducing the tendency for oscillations at both of these frequency regions. For example, the resonant cavities 160 in three of the spacers 144 may be tuned to slightly different frequencies near the upper cutoff frequency so as to resonate in the respective frequency bands C, D, and E, thereby creating the over-all loss band F, as has been mentioned above; and, in addition, the respective resonant cavities 150 may be tuned to slightly different frequencies near the lower cutoff frequency so as to provide individual loss bands G, H, and I, respectively, thereby forming the composite loss band J in the vicinity of the lower cutoff frequency $\omega_l$. Here again, three individual loss bands have been shown solely for illustrative purposes. Thus, resonant loss is introduced in well defined frequency bands disposed about both the upper and lower cutoff frequencies, and therefore, any tendency for the traveling-wave tube to oscillate in the vicinity of these frequencies is greatly reduced.

It may be observed from FIG. 16 that a well defined frequency passband exists between the bottom of the loss band E and the top of the loss band G, and frequencies in this passband region may be amplified by the traveling-wave tube. It should be pointed out, however, that in order for the double solid loss button arrangement of FIGS. 7 and 8 to be successfully employed, the width of the tube passband, i.e., $\omega_u - \omega_l$ approximately, must be less than or equal to the difference between the fundamental frequency of the resonant loss cavity for $\omega_l$ and its next higher order resonant mode. In other words, since the resonant loss cavity 150 is designed to resonate in its fundamental mode in the vicinity of the lower cutoff frequency of the tube, the next higher order resonance of the cavity 150 must occur at a frequency equal to or higher than $\omega_u$, because, if it did not, a resonant loss band would be introduced somewhere between $\omega_l$ and $\omega_u$, thereby placing a stop band within the desired passband of the tube.

Figure 9:
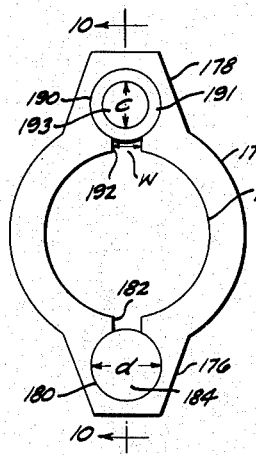
FIG. 9 is a plan view of a slow-wave circuit spacer element provided with a solid resonant loss element and a reentrant type of resonant loss arrangement according to a further embodiment of the present invention.
Figure 10:
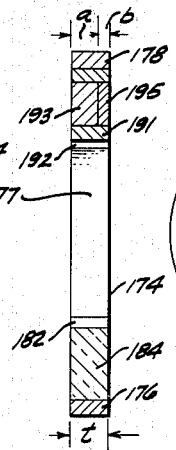
FIG. 10 is a sectional view taken along line 10—10 of FIG. 9.

A further embodiment of the present invention, which is illustrated in FIGS. 9 and 10, employs reentrant, or stub-loaded, resonant loss cavities. In this embodiment a slow-wave circuit spacer element 174 is employed which is identical to the spacer 144 of FIGS. 7 and 8. More specifically, the spacer 174 is provided with a pair of cavities 180 and 190 in its projecting portions 176 and 178, respectively, and which cavities are coupled to central aperture 177 in the spacer 174 by means of irises 182 and 192, respectively. As was the case with the spacer 114 of FIG. 5, the cavities 180 and 190 each have a diameter "$d$," the coupling irises 182 and 192 each have a width "$w$," and the spacer 174 has a thickness "$t$." The cavity 180 is tuned to resonate at a frequency near the upper cutoff frequency $\omega_u$ and contains a solid cylindrical button 184 which is identical to the button 134 of FIG. 5. However, the cavity 190 is made reentrant. The reentrant arrangement comprises an annular ring 191 of a lossy ceramic material, for example a mixture of forsterite and silicon carbide substantially in the same percentages described above. Disposed within the ring 191 is a cylindrical button 193 of ceramic material, such as forsterite, and a metal stub 195 which may be, for example, molybdenum. The ceramic button, or stub, 193 may or may not contain a small percentage of lossy material, for example silicon carbide. The ceramic button 193 has a height "$a$," while the height of the metal tuning stub 195 is designated by "$b$." The inner diameter of the ring 191, which is essentially the same as the outer diameter of the button 193 and the stub 195, is designated as "$c$."

The stub-loaded or, reentrant, cavity is tunable to the desired resonant frequency simply by varying the relative heights "$a$" and "$b$" of the ceramic stub 193 and the metal tuning stub 195. Thus, when a reentrant cavity is employed, the dimensions of the coupling iris 192 and the cavity 190 may be maintained the same in all of the spacers 174, with the resonant frequency of the cavity being varied simply by varying the relative dimensions "$a$" and "$b$" of the ceramic stub 193 and the tuning stub 195, respectively.

Exemplary values for the dimensions of the reentrant cavity 190 may be as follows. The diameter "$d$" of the cavity 190 may be the same as that of the cavity 130 in the spacer 114 of FIG. 5. The diameter "$c$," which is the inner diameter of the ring 191, may be around 0.150 inch, while the thickness "$t$" of the spacer 174 may be 0.114 inch, which is the same as the thickness of the spacers 114 and 144 of FIGS. 5 and 7. The height "$b$" of the metal tuning stub 195 may vary from 0 (which corresponds to no tuning stub) to around 0.065 inch, while the corresponding height "$a$" of the ceramic stub 193 would in turn vary from 0.114 inch to 0.049 inch. The following table illustrates how the resonant frequency is changed by varying the dimensions "$a$" and "$b$" of the stubs 193 and 195. It is to be understood that these values are given solely for illustrative purposes and are in no way intended to limit the dimensions of the reentrant cavity.

| Tuning Stub Height "$b$" (Inches) | Ceramic Stub Height "$a$" (Inches) | Resonant Frequency (kmc.) |
|---|---|---|
| 0 | 0.114 | 9.5 |
| 0.050 | 0.064 | 8.0 |
| 0.065 | 0.049 | 7.0 |

Figure 11:
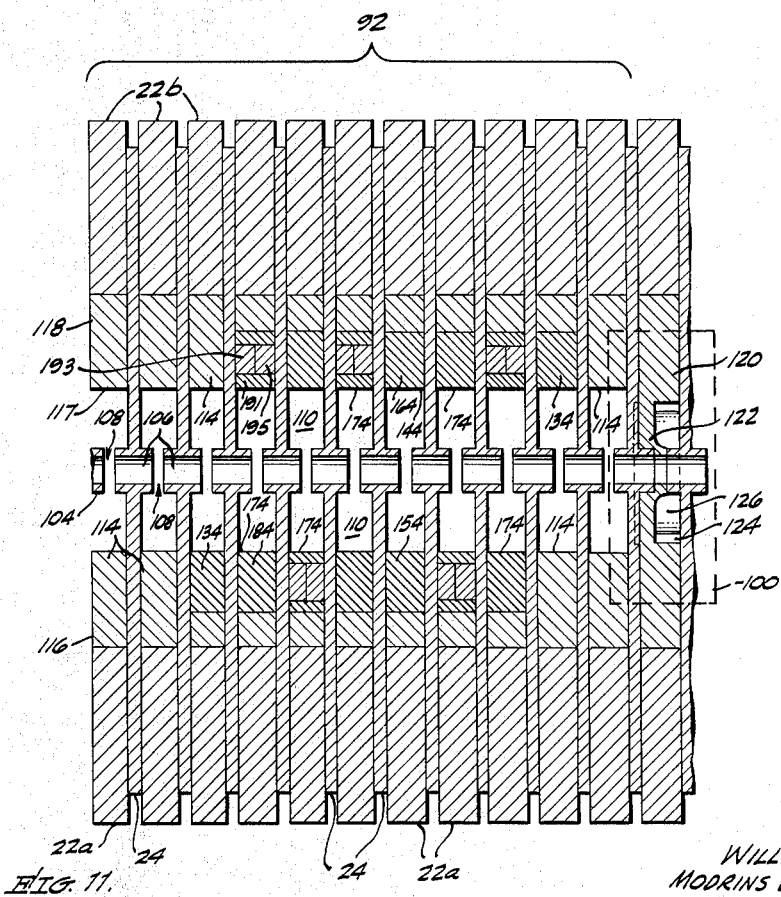
FIG. 11 is a longitudinal sectional view similar to FIG. 4 illustrating a slightly more complex arrangement of resonant loss devices in a traveling-wave tube.

FIG. 11 illustrates a manner in which reentrant resonant loss cavities may be arranged in a traveling-wave tube in accordance with the present invention in order to substantially eliminate oscillations in the vicinity of the edges of the tube's frequency passband. It should be emphasized that the arrangement shown in FIG. 11 is purely illustrative, representing one particular embodiment which has been constructed and operated successfully, and numerous other arrangements including reentrant resonant loss cavities are possible and within the scope of the invention. Referring to FIG. 11, it may be observed that starting from the left hand end of the slow-wave structure, the first two spacers 114 do not contain any resonant loss buttons. Next a spacer 114 of the type of FIG. 5 is provided containing a single solid loss button 134, after which three spacers 174 are disposed, each containing a solid button 184 on one side and a reentrant arrangement with a variable height stub 193 provided on the other side. The reentrant cavities in the three spacers 174 are shown as alternating from one side of the drift tubes 106 to the other, although this is not necessary for desired operation. After the three spacers 174, a spacer 144 of the type of FIG. 7 is provided having a pair of solid loss buttons 154 and 164. This is followed by two more spacers 174 each having one reentrant cavity and one nonreentrant cavity, which in turn are followed by a spacer 114 containing a single solid loss button 134 and a spacer 114 with no loss buttons. In the arrangement of FIG. 11 the solid buttons are made to attenuate energy in the vicinity of the upper cutoff frequency $\omega_u$, while the elements 191 in the reentrant cavities 190 are made to attenuate energy in the vicinity of the lower cutoff frequency $\omega_l$. Both the reentrant and the nonreentrant cavities, of course, may be stagger tuned to provide attenuation bands throughout the regions encompassing $\omega_l$ and $\omega_u$. Thus, the hollow button-solid button arrangement of FIGS. 9 and 10 may be used to provide the loss bands F and J of FIG. 16.

Figure 18:
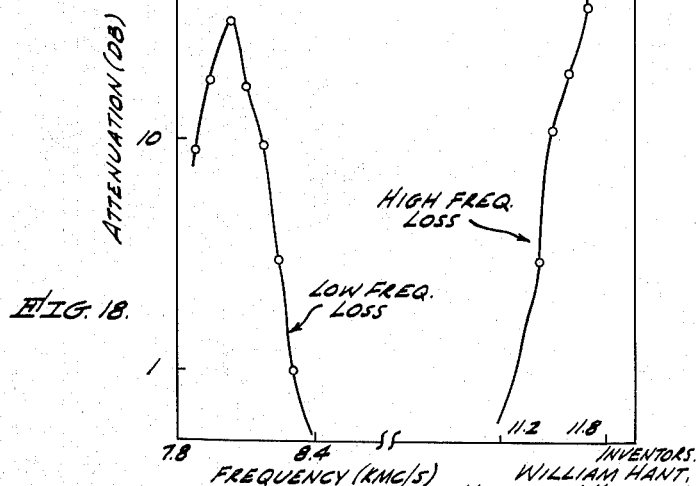
FIG. 18 is a graph of attenuation vs. frequency for a traveling-wave tube constructed essentially in accordance with FIG. 11.

A graph showing attenuation as a function of frequency for the slow-wave circuit of FIG. 11 is illustrated in FIG. 18. In this circuit the solid loss buttons are used to attenuate frequencies in the vicinity of the upper cutoff frequency of the circuit to provide the high frequency loss, and the hollow loss buttons in the reentrant cavities are made to attenuate frequencies in the vicinity of the lower cutoff frequency to provide the low frequency loss. As will be evident from FIG. 18, the low frequency loss resonates essentially at 8.1 kmc. per second, while the high frequency loss resonates at around 11.8 kmc. per second, with the circuit having a well defined frequency passband essentially between 8.4 and 11.2 kmc. per second.

As will be apparent, the ability to vary the resonant frequency of the cavity simply by changing the relative heights "$a$" and "$b$" of the ceramic stub and the metal tuning stub, while maintaining the outside diameter "$d$" of the cavity and the width "$w$" of the coupling hole constant, gives the reentrant loss arrangement several important advantages over the solid button loss arrangements of FIGS. 5 and 7. First, since the resonant frequency can be varied over a considerable range without changing the outside dimensions of the cavity 190, it is possible to have all of the spacers 174 in the slow-wave structure the same dimensions and achieve stagger tuning of the individual resonant loss cavities simply by changing the inner stub heights. Moreover, insertion of the metal tuning stub 195 into the cavity 190 increases the separation between the fundamental resonant frequency of the cavity and the next higher order mode. Thus when reentrant cavities are employed, by making the reentrant cavity resonant in its fundamental mode at the lower cutoff frequency $\omega_l$, the next higher order resonant mode of the cavity will occur farther away from $\omega_l$, than if a nonreentrant cavity were used. This facilitates the design of traveling-wave tubes having wider passbands, because on account of the greater frequency separation between the fundamental and higher order resonance, it is easier to insure that the higher order resonant mode for the loss cavity will occur at a frequency greater than the upper cutoff frequency $\omega_u$ of the tube.

The reentrant loss cavities possess a still further advantage over the nonreentrant cavities, namely, the harmonic resonances of the reentrant cavities can be used to introduce loss at desired frequencies. Thus, in accordance with a further embodiment of the present invention, reentrant loss cavities are made to resonate in their fundamental mode at the lower cutoff frequency $\omega_l$ of the tube and to resonate in their next higher order resonant mode at the upper cutoff frequency $\omega_u$ of the tube. Thus, a single reentrant cavity is used to introduce loss at both the upper and lower cutoff frequencies; hence half the loss cavities are required to provide the same loss that would otherwise be provided by using separate resonant cavities for the upper and lower cutoff frequencies. In addition, higher order resonant modes of the reentrant cavities may be adjusted to provide loss for the higher passbands of the slow-wave circuit. On account of the fact that when reentrant cavities are employed a greater frequency separation between the fundamental and higher order resonances can be obtained, the double resonance technique would insure a maximum passband for the tube, while minimizing the number of loss buttons required. It is also apparent that stagger tuning can be accomplished with the double resonance technique, i.e., a plurality of reentrant cavities are provided, each being resonant in its fundamental mode at a slightly different frequency in the vicinity of the lower cutoff frequency of the tube and being resonant in its next higher order mode at a slightly different frequency in the vicinity of the upper cutoff frequency of the tube, thereby substantially eliminating oscillations throughout bands of frequencies including the upper and lower cutoff frequencies.

Figure 12:
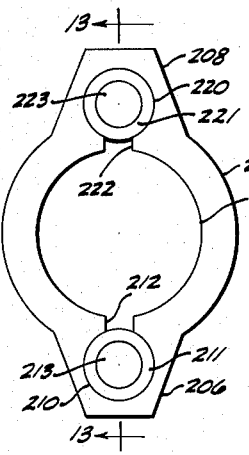
FIG. 12 is a plan view of a slow-wave circuit spacer element provided with a pair of reentrant type resonant loss arrangements according to a still further embodiment of the present invention.
Figure 13:
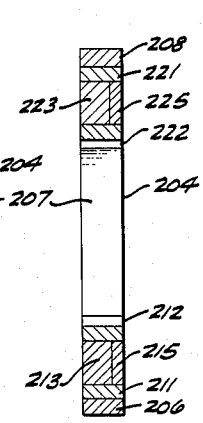
FIG. 13 is a sectional view taken along line 13—13 of FIG. 12.

A still further embodiment of the present invention is illustrated in FIGS. 12 and 13. In this embodiment reentrant cavities are provided on both sides of a slow-wave circuit spacer element. More specifically, as is shown in FIGS. 12 and 13, spacer 204 is provided with cavities 210 and 220 in its projecting ear portions 206 and 208, respectively. A reentrant loss arrangement comprising a ring 211 of lossy ceramic material which is disposed about a ceramic button 213 and a metal tuning stub 215 is provided in the cavity 210; similarly, a like reentrant loss arrangement comprising lossy ceramic ring 221 which is disposed about ceramic button 223 and metal tuning stub 225 is provided in the cavity 220. Irises 212 and 222 couple the respective reentrant cavities 210 and 220 to central aperture 207 in the spacer 204.

From the foregoing description it should be apparent that numerous tuning arrangements are possible with the double reentrant cavity spacers 204, and the double reentrant cavity spacer allows for a large amount of versatility with respect to introducing resonant loss to the slow-wave circuit at any desired frequency or frequencies. Not only does this afford considerable control over the width and the Q of the loss bands introduced at both the upper and lower cutoff frequencies of the tube, but it also enables control to be exercised over the width and the shape of the frequency passband of the tube. Moreover, the reentrant cavity arrangements allow for maximum efficiency in tube design, because the outside diameter of the cavities, the width of the coupling holes and the compositions used for the lossy material may all be the same, with control over the various resonant loss frequencies being achieved simply by varying the height of the metal tuning stubs.

Figure 14:
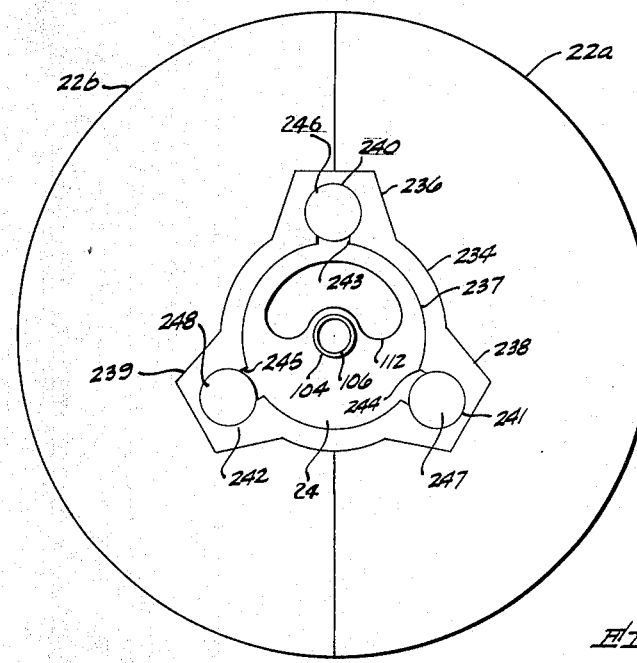
FIG. 14 is a cross-sectional view of a traveling-wave tube similar to FIG. 2 illustrating a slow-wave circuit spacer element provided with three resonant loss elements in accordance with a still further embodiment of the present invention.

It should also be pointed out that the present invention is not limited to spacers of two-eared variety such as those shown in FIGS. 5–10 and 12–13, and other arrangements for providing varying numbers of resonant loss elements are possible and within the scope of the invention. One such arrangement is illustrated in FIG. 14. In this figure a spacer 234 is shown provided with three projecting ear portions 236, 238, and 239. Each of these projecting ears defines a resonant cavity 240, 241, and 242, respectively, which is coupled to central aperture 237 in spacer 234 via coupling irises 243, 244, and 245, respectively. Loss buttons 246, 247, and 248 are provided in the cavities 240, 241, and 242, respectively. It is to be understood that although these loss buttons are shown as solid cylindrical buttons for purposes of simplicity they may also be of the hollow variety so as to provide reentrant cavities, or one or two of the cavities may be reentrant while the remaining ones are nonreentrant.

Figure 15:
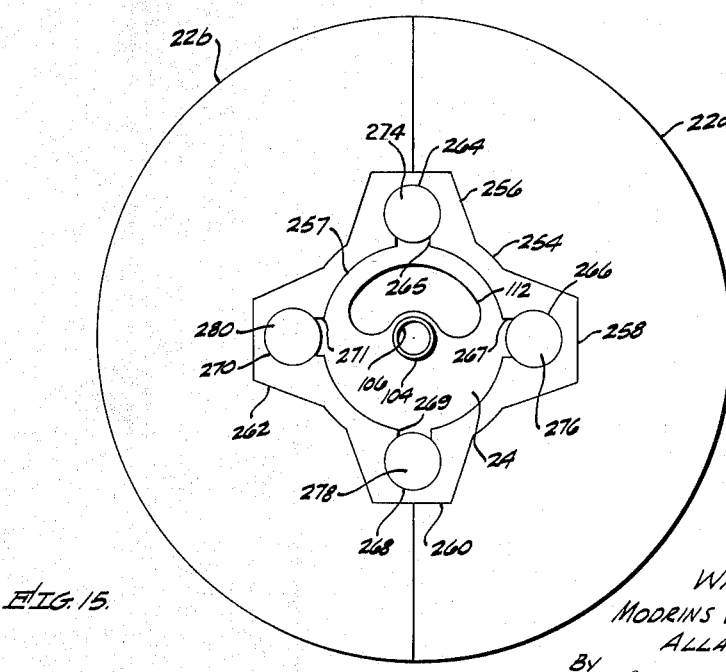
FIG. 15 is a view similar to FIG. 14 illustrating a slow-wave circuit spacer element provided with four resonant loss elements according to a still further embodiment of the present invention.

A further modification is illustrated in FIG. 15. In this figure a spacer 254 has four projecting ear portions 256, 258, 260, and 262, each of which defines a resonant cavity 264, 266, 268, and 270, respectively. These cavities are coupled to central aperture 257 by means of coupling irises 265, 267, 269, and 271, respectively, and contain loss buttons 274, 276, 278, and 280, respectively. Again, these loss buttons are illustrated as solid cylindrical buttons for purposes of simplicity, but it is to be understood that one or more may be of the hollow variety.

It will be apparent that the azimuthal distribution of the loss elements, as well as their axial distribution, is arbitrary, and slow-wave circuit spacers may be designed with $n$ cavities spaced $360°/n$ apart along the circumference of the central aperture in the spacer, where $n$ is a positive interger. The essential criteria are that the resonant loss cavities be tuned to the desired frequencies at which loss is to be introduced and sufficient cavities be provided to establish loss bands of the proper width and shape.

Although the present invention has been shown and described with reference to particular embodiments, nevertheless, various changes and modifications obvious to one skilled in the art are deemed to be within the spirit, scope and contemplation of the invention.

We claim:

1. A device for providing interaction between a stream of charged particles projected along a predetermined path and an electromagnetic wave comprising: slow-wave structure means for propagating said electromagnetic wave in such manner as to provide energy exchange between said stream of charged particles and said electromagnetic wave, means defining at least one cavity electromagnetically coupled to said slow-wave structure means, said cavity being resonant at a preselected frequency, and loss means disposed in said cavity for attenuating energy at said preselected frequency.

2. A device for providing interaction between a stream of charged particles projected along a predetermined path and an electromagnetic wave comprising: slow-wave structure means for propagating said electromagnetic wave in such manner as to provide energy exchange between said stream of charged particles and said electromagnetic wave, means defining a plurality of cavities electromagnetically coupled to said slow-wave structure means, each cavity being resonant at a slightly different frequency in a band of frequencies including a pre-selected frequency, and loss means disposed in each said cavity for attenuating energy at the resonant frequency of the said cavity, whereby oscillations throughout said band of frequencies including said preselected frequency are substantially eliminated.

3. A device for providing interaction between a stream of charged particles projected along a predetermined path and an electromagnetic wave of a frequency within a predetermined frequency range comprising: slow-wave structure means for propagating said electromagnetic wave in such manner as to provide energy exchange between said stream of charged particles and said electromagnetic wave, means defining at least one cavity electromagnetically coupled to said slow-wave structure means, said cavity being resonant at a frequency in the vicinity of at least one extremity of said predetermined frequency range, and loss means disposed in said cavity for attenuating energy at said resonant frequency, whereby oscillations at said resonant frequency are substantially eliminated.

4. A device according to claim 3 wherein said loss means is a lossy ceramic material comprising a mixture of silicon carbide and a material selected from the group consisting of forsterite, alumina, and talc.

5. A device according to claim 4 wherein said lossy ceramic material comprises a mixture of essentially between 90 and 97% forsterite and essentially between 3 and 10% silicon carbide.

6. A device according to claim 3 wherein said loss means is a lossy ceramic material having a ratio of dielectric constant $\epsilon'$ to loss constant $\epsilon''$ of the order of 50 and a quality factor Q of essentially between 10 and 100.

7. A device for providing interaction between a stream of charged particles projected along a predetermined path and an electromagnetic wave of a frequency within a predetermined frequency range having an upper cutoff frequency and a lower cutoff frequency comprising: slow-wave structure means for propagating said electromagnetic wave in such manner as to provide energy exchange between said stream of charged particles and said electromagnetic wave, means defining at least one cavity electromagnetically coupled to said slow-wave structure means, said cavity being resonant at said upper cutoff frequency, and loss means disposed in said cavity for attenuating energy at said upper cutoff frequency, whereby oscillations at said upper cutoff frequency are substantially eliminated.

8. A device for providing interaction between a stream of charged particles projected along a predetermined path and an electromagnetic wave of a frequency within a predetermined frequency range having an upper cutoff frequency and a lower cutoff frequency comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and at least a pair of cavities electromagnetically coupled to at least one of said interaction cells, one of said pair of cavities being resonant at a frequency essentially equal to said upper cutoff frequency and the other of said pair of cavities being resonant at a frequency essentially equal to said lower cutoff frequency, and loss means disposed in each of said pair of cavities for attenuating energy at the resonant frequency of the said cavity, whereby oscillations at the said resonant frequencies are substantially eliminated.

9. A device for providing interaction between a stream of charged particles projected along a predetermined path and an electromagnetic wave of a frequency within a predetermined frequency range having an upper cutoff frequency and a lower cutoff frequency comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and a plurality of pairs of cavities, each pair being electromagnetically coupled to a different one of said interaction cells and including a first cavity and a second cavity, each of said first cavities being resonant at a slightly different frequency in a band of frequencies including said upper cutoff frequency, each of said second cavities being resonant at a slightly different frequency in a band of frequencies including said lower cutoff frequency, and loss means disposed in each said cavity for attenuating energy at the resonant frequency of the said cavity, whereby oscillations throughout said bands of frequencies including said upper and said lower cutoff frequencies are substantially eliminated.

10. A device for providing interaction between a stream of charged particles projected along a predetermined path and an electromagnetic wave of a frequency within a predetermined frequency range comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and at least one cavity electromagnetically coupled to at least one of said interaction cells, said cavity having a conductive element projecting thereinto and being resonant at a frequency in the vicinity of at least one extremity of said predetermined frequency range, and loss means disposed in said cavity for attenuating energy at said resonant frequency, whereby oscillations at said resonant frequency are substantially eliminated.

11. A device for providing interaction between a stream of charged particles projected along a predetermined path and an electromagnetic wave of a frequency within a predetermined frequency range comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and at least one cavity electromagnetically coupled to at least one of said interaction cells, said cavity being resonant at a frequency in the vicinity of at least one extremity of said predetermined frequency range, a hollow element of a lossy ceramic material disposed in said cavity, a ceramic stub disposed within said hollow element and extending to a predetermined fraction of the length of said hollow element, and a metal stub disposed within said hollow element along the remaining fraction of its length.

12. A device according to claim 11 wherein said ceramic stub contains a lossy material.

13. A device for providing interaction between a stream of charged particles projected along a predetermined path and an electromagnetic wave of a frequency within a predetermined frequency range having an upper cutoff frequency and a lower cutoff frequency comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and at least a pair of cavities electromagnetically coupled to at least one of said interaction cells, one of said pair of cavities being resonant at a frequency essentially equal to said upper cutoff frequency and the other of said cavities having a conductive element projecting thereinto and being resonant at a frequency essentially equal to said lower cutoff frequency, a solid lossy element disposed in said one of said pair of cavities for attenuating energy at the resonant frequency of said one cavity, and a hollow lossy element disposed in said other of said pair of cavities about at least a portion of said conductive element for attenuating energy at the resonant frequency of said other cavity, whereby oscillations at the said resonant frequencies are substantially eliminated.

14. A device for providing interaction between a stream of charged particles projected along a predetermined path and an electromagnetic wave of a frequency within a predetermined frequency range having an upper cutoff frequency and a lower cutoff frequency comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and a plurality of cavities, each cavity being electromagnetically coupled to one of said interaction cells, at least one of said cavities being resonant at a frequency essentially equal to said upper cutoff frequency and at least another of said cavities having a conductive element projecting thereinto and being resonant at a frequency essentially equal to said lower cutoff frequency, a solid lossy element disposed in said one cavity for attenuating energy at said frequency essentially equal to said lower cutoff frequency, and a hollow lossy element disposed in said another cavity about at least a portion of said conductive element for attenuating energy at said frequency essentially equal to said lower cutoff frequency, whereby oscillations at the said resonant frequencies are substantially eliminated.

15. A device for providing interaction between a stream of charged particles projected along a predetermined path and an electromagnetic wave of a frequency within a predetermined frequency range having an upper cutoff frequency and a lower cutoff frequency comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and at least a pair of cavities electromagnetically coupled to at least one of said interaction cells and each having a conductive element projecting thereinto, one of said pair of cavities being resonant at a frequency essentially equal to said upper cutoff frequency and the other of said pair of cavities being resonant at a frequency essentially equal to said lower cutoff frequency, and a hollow lossy element disposed in each of said cavities about at least a portion of the conductive element therein for attenuating energy at the resonant frequency of said cavity, whereby oscillations at the said resonant frequencies are substantially eliminated.

16. A device for providing interaction between a stream of charged particles projected along a predetermined path and an electromagnetic wave of a frequency within a predetermined frequency range having an upper cutoff frequency and a lower cutoff frequency comprising: slow-wave structure means for propagating said electromagnetic wave in such manner as to provide energy exchange between said stream of charged particles and said electromagnetic wave, said slow-wave structure means defining a plurality of intercoupled interaction cells arranged along and in electromagnetic interacting relationship with said stream of charged particles and at least one cavity electromagnetically coupled to one of said interaction cells and having a conductive element projecting thereinto, said cavity being resonant in its fundamental mode at a frequency essentially equal to said lower cutoff frequency and resonant in its next higher order mode than said fundamental mode at a frequency essentially equal to said upper cutoff frequency, and loss means disposed in said cavity for attenuating energy at the said resonant frequencies, whereby oscillations at said resonant frequencies are substantially eliminated.

17. A slow-wave structure for propagating an electromagnetic wave in such manner as to provide interaction between a stream of charged particles projected along a predetermined path and said electromagnetic wave, said slow-wave structure comprising: a plurality of axially-aligned essentially annular magnets, a plurality of ferromagnetic pole pieces interposed between and abutting adjacent magnets, a hollow essentially cylindrical nonmagnetic spacer element having an outer diameter essentially equal to the inner diameter of said essentially annular magnets disposed within each of said magnets, said pole pieces projecting internally of said spacer elements to define therewith a plurality of intercoupled interaction cells for said stream of charged particles and said electromagnetic wave, at least one of said spacer elements defining at least one cavity disposed externally of and opening into the space defined by the inner surface of said spacer element, and lossy material disposed in said cavity.

18. A slow-wave structure for propagating an electromagnetic wave in such manner as to provide interaction between a stream of charged particles projected along a predetermined path and said electromagnetic wave, said slow-wave structure comprising: a plurality of axially-aligned essentially annular magnets, a plurality of ferromagnetic pole pieces interposed between and abutting adjacent magnets, a hollow essentially cylindrical nonmagnetic spacer element having an outer diameter essentially equal to the inner diameter of said essentially annular magnets disposed within each of said magnets, said pole pieces projecting internally of said spacer elements to define therewith a plurality of intercoupled interaction cells for said stream of charged particles and said electromagnetic wave, at least one of said spacer elements defining $n$ cavities disposed externally of and spaced $360°/n$ apart along the circumference of said spacer element, where $n$ is a positive integer, said cavities opening into the space defined by the inner surface of said spacer element, and lossy material disposed in each said cavity.

19. A traveling-wave tube comprising: means for providing a stream of electrons along a predetermined path, slow-wave structure means disposed along and about said path for propagating electromagnetic wave energy within a predetermined frequency range in such manner that it interacts with said stream of electrons, frequency selective means for removing from said slow-wave structure means electromagnetic wave energy within a small portion of said predetermined frequency range without substantially affecting electromagnetic wave energy within the remainder of said predetermined frequency range, and loss means associated with said frequency selective means for attenuating said removed electromagnetic wave energy.

20. A traveling-wave tube comprising: means for providing a stream of electrons along a predetermined path, slow-wave structure means disposed along and about said path for propagating electromagnetic wave energy within a predetermined frequency range in such manner that it interacts with said stream of electrons, frequency selective means for removing electromagnetic wave energy within a preselected frequency range substantially smaller than said predetermined frequency range from said slow-wave structure means, and non-magnetic loss means associated with said frequency selective means for attenuating energy within said preselected frequency range.

21. A traveling-wave tube comprising: means for providing a stream of electrons along a predetermined path, slow-wave structure means disposed along and about said path for propogating electromagnetic wave energy within a predetermined frequency range in such manner that it interacts with said stream of electrons, frequency selective means for removing electromagnetic wave energy within a preselected frequency range substantially smaller than said predetermined frequency range from said slow-wave structure means, and reciprocal loss means associated with said frequency selective means for attenuating energy within said preselected frequency range.

22. A traveling-wave tube comprising: means for providing a stream of electrons along a predetermined path, slow-wave structure means including a plurality of intercoupled interaction cells disposed along and in electromagnetic interacting relationship with said stream of electrons for propagating electromagnetic wave energy within a predetermined frequency range in such manner that it interacts with said stream of electrons, frequency selective means coupled to at least one of said interaction cells for removing from said interaction cell electromagnetic wave energy within a small portion of said predetermined frequency range witiout substantially affecting electromagnetic wave energy within the remainder of said predetermined frequency range, and loss means associated with said frequency selective means for attenuating said removed electromagnetic wave energy.

23. A traveling-wave tube comprising: means for providing a stream of electrons along a predetermined path, slow-wave structure means including a plurality of intercoupled interaction cells disposed along and in electromagnetic interacting relationship with said stream of electrons for propagating electromagnetic wave energy within a predetermined frequency range in such manner that it interacts with said stream of electrons, frequency selective means coupled to at least one of said interaction cells for removing from said interaction cell electromagnetic wave energy within a small portion of said predetermined frequency range without substantially affecting electromagnetic wave energy within the remainder of said predetermined frequency range, and non-magnetic reciprocal loss means associated with said frequency selective means for attenuating said removed electromagnetic wave energy.

24. A traveling-wave tube comprising: means for providing a stream of electrons along a predetermined path, slow-wave structure means including a plurality of intercoupled interaction cells disposed along and in electromagnetic interacting relationship with said stream of electrons for propagating electromagnetic wave energy within a predetermined frequency range in such manner that it interacts with said stream of electrons, resonant cavity means coupled to at least one of said interaction cells for removing from said interaction cell electromagnetic wave energy within a small portion of said predetermined frequency range without substantially affecting electromagnetic wave energy within the remainder of said predetermined frequency range, and loss means disposed in said resonant cavity means for attenuating said removed electromagnetic wave energy.

25. A traveling-wave tube comprising: means for providing a stream of electrons along a predetermined path, slow-wave structure means including a plurality of intercoupled interaction cells disposed along and in electromagnetic interacting relationship with said stream of electrons for propagating electromagnetic wave energy within a predetermined frequency range in such manner that it interacts with said stream of electrons, resonant cavity means coupled to at least one of said interaction cells for removing from said interaction cell electromagnetic wave energy within a small portion of said predetermined frequency range without substantially affecting electromagnetic wave energy within the remainder of said predetermined frequency range, and non-magnetic reciprocal loss means disposed in said resonant cavity means for attenuating said removed electromagnetic wave energy.

References Cited by the Examiner

UNITED STATES PATENTS

| 2,785,381 | 3/1957 | Brown | 333—93 X |
| 2,934,672 | 4/1960 | Pollack et al. | 333—83 |
| 2,970,242 | 1/1961 | Jepsen | 315—5.39 |

FOREIGN PATENTS 921,166  7/1949  Germany.

HERMAN KARL SAALBACH, *Primary Examiner.*

ARTHUR GAUSS, GEORGE N. WESTBY, ROBERT SEGAL, *Examiners.*

UNITED STATES PATENT OFFICE
CERTIFICATE OF CORRECTION

Patent No. 3,221,204 November 30, 1965

William Hant et al.

It is hereby certified that error appears in the above numbered patent requiring correction and that the said Letters Patent should read as corrected below.

Column 5, line 2, for "cathode-" read -- cathode beam- --; column 7, line 5, for "3,010,847" read -- 3,010,047 --; column 8, line 68, after "0.25" insert -- inch --; column 10, line 14, for "resonant", second occurrence, read -- resonate --; line 41, for "7" read -- 17 --.

Signed and sealed this 18th day of October 1966.

(SEAL)
Attest:

ERNEST W. SWIDER
Attesting Officer

EDWARD J. BRENNER
Commissioner of Patents